(12) United States Patent
Vasudevan et al.

(10) Patent No.: US 8,868,674 B2
(45) Date of Patent: Oct. 21, 2014

(54) STREAMING AND BULK DATA TRANSFER TRANSFORMATION WITH CONTEXT SWITCHING

(75) Inventors: Gauthaman Vasudevan, Old Bridge, NJ (US); Hagay Orgil, Lakewood, NJ (US)

(73) Assignee: Exar Corporation, Fremont, CA (US)

( * ) Notice: Subject to any disclaimer, the term of this patent is extended or adjusted under 35 U.S.C. 154(b) by 140 days.

(21) Appl. No.: 13/368,448

(22) Filed: Feb. 8, 2012

(65) Prior Publication Data

US 2013/0138761 A1 May 30, 2013

Related U.S. Application Data

(60) Provisional application No. 61/564,971, filed on Nov. 30, 2011.

(51) Int. Cl.
*G06F 15/16* (2006.01)
(52) U.S. Cl.
CPC ...................................... *G06F 15/16* (2013.01)
USPC ........................................................ 709/213

(58) Field of Classification Search
CPC ........... G06F 13/12; H03M 7/42; H04L 29/06
USPC ........................................................ 709/213
See application file for complete search history.

(56) References Cited

U.S. PATENT DOCUMENTS

| 5,155,484 A | * | 10/1992 | Chambers, IV | ................. | 341/55 |
| 7,051,126 B1 | * | 5/2006 | Franklin | ......................... | 710/68 |
| 2009/0287839 A1 | * | 11/2009 | Fallon et al. | .................. | 709/231 |

* cited by examiner

*Primary Examiner* — Vivek Srivastava
*Assistant Examiner* — Gary Dennis

(57) ABSTRACT

In described embodiments, processing of a data stream, such as a packet stream or flow, associated with data streaming is improved by context switching that employs context history. For each data stream that is transformed through processing, a context is maintained that comprises state information and includes a history and state information that enables the transformation for the data stream. Processing for the data transformation examines currently arriving data and then processes the data based on the context data and previously known context information for the data stream from the history stored in memory.

5 Claims, 3 Drawing Sheets

STREAMING AND BULK DATA TRANSFER TRANSFORMATION WITH CONTEXT SWITCHING

CROSS-REFERENCE TO RELATED APPLICATIONS

This application claims the benefit of the filing date of U.S. provisional application No. 61/564971 filed on Nov. 30, 2011, the teachings of which are incorporated herein by reference.

BACKGROUND OF THE INVENTION

1. Field of the Invention

The present invention relates to data storage servers, data networks, and, in particular, to accelerators for data transfer.

2. DESCRIPTION OF THE RELATED ART

Many applications require bulk data transfer, and in sonic applications such as streaming video. the data transfer requires low latency. Servers, used for bulk data transfer, data backup and streaming video, transfer data by reading the data from locally attached storage or from the storage attached over the network such as SAN(Storage Area Network) or NAS (Network Attached Storage) and send that data over the network after packaging it with the appropriate network protocols. FIG. 1 shows a typical processing architecture as might be found in the prior art.

Main processor 101 transfers a number of data streams between devices coupled to input interface 102, and devices coupled to output interface 103. Main processor 101, to accomplish this transfer, typically must provide several levels of processing. As shown in FIG. 1, main processor 101 is coupled to several sub-processing modules: cryptography module 104, compression module 105, multi-media module 106, network protocol module 107, and digest generation module 109. These various modules share memory 108, typically a form of cache memory, to enable differing types of processing, or data transformation. Cryptography module 104 might be employed to provide encryption and decryption of data in accordance with any of a number of well-know data security standards. Compression module 105 might be employed to compress data for storage or expand compressed data from storage media. Multi-media module 106 might be employed to decode video and audio data in accordance with any one of the MPEG standards, and network protocol module 107 might be employed to translate between different types of packet protocols. Digest generation module 109 may be used to calculate hash values, or signatures for strings of data. These sub--processing modules might be implemented in software. hardware or some combination of software and hardware.

Context switching refers to when a multi-tasking operating system (e.g., main processor 101) stops running one process and starts running another. Many operating systems implement concurrency by maintaining separate environments or "contexts" for each process. The amount of separation between processes, and the amount of information in a context, depends on the operating system, but generally higher level coordination is employed to prevent processes from interfering with each other (e.g., by modifying each other's memory data, or pages). A context switch might simply change values of program counter(s) and stack pointer(s), or might reset the entire processor unit to make a different set of memory pages available. Many systems context switch at an exceptionally high rate in order w present the user with an impression of parallel processing, and to allow processes to respond quickly to external events.

Bulk data transfer, such as video streaming and large file transfers for backup, require considerable time in disk input/output (IO) and network IO. For example, data, which is stored in the file format on the disk is read and packaged into the network packets and sent over the network interface. The data goes through various disk IO protocol stacks on the storage side and through various network protocol stacks on the network side. The IO path is multi level and goes through various layers in the disk driver, applications and network stack. This transformation of data through various layers requires many CPU cycles, is bound by the CPU IO capacity, and might introduce considerable latency due to the various types of multi-tasked processing of the data streams.

As is evident from the above discussion, data transformation for streaming data is a challenge for various types of dedicated processing modules within, for example, the server due to variation of input arrival rates, thereby reducing quality of the data transformation performed by each dedicated processing module. An example would be a compression transformation on streaming data, which is normally inefficient when confronted with a variation of input arrival rates. Another example is the cryptographic function often employed in data storage and transfer, where there is relationship within the data stream such as chaining in AES-CBC cryptography. The loss of a current state when a relationship exists requires a restart of the encryption engine, reducing the encryption strength. State full stream transformation is required for security transformations such as AES-CBC. Performing the encryption as individual blocks of data, however, would require the AES-CBC encryption initialization vector to be setup for every block, which reduces the security level of the transformation.

Stateless or segmented or packetized transformation processing is simple, but degrades the quality of the transformation. In the case of compression, the compaction ratio is reduced when the transformation is applied to independently to pieces of information. Further, if data is compressed immediately, then there is too little data to be compressed, reducing the compress gains, tithe input data is buffered for too long, then the latency of the stream increases. Providing significant compression on streaming data thus provides many challenges to the system designer.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides for context switching by applying, by a processing core, a data transformation to at least one portion of a received data stream. The processing core generates i) corresponding current context data based on the data transformation of the at least one portion; and ii) a signal when the data transformation completes. Each context data for a corresponding data stream is stored in a context memory, the context data including transformation data and history information for each data transformation applied to one or more portions of the corresponding data stream. Transfer is coordinated. by a context control module based on the signal, of current context data for the at least one portion of the received data stream between the processing core and the context memory; and when the processing core receives the data stream, transfer is coordinated by the context control module of previous context data, if present, in the context memory for the data transformation.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with exemplary embodiments of the present invention, processing of a data stream, generally as a packet stream or flow, associated with, for example, streaming data is provided by improved methods of context switching. For every data stream that is transformed, a context is maintained that comprises state information that enables the data transformation. Data transformations might include compression, encryption, virus-scanning, network protocol conversion, and packet filtering functions. The context includes a history and state information for a packet stream that improves packet processing, such as providing compression so as to improve compression ratio and lower latency for the data stream. Data stream processing for data transformation in accordance with embodiments of the present invention examines at least one portion e.g., one or more packets) of currently arriving data and then processes the data based on previously known context information for the data stream from a corresponding context history. Embodiments of the present invention are described below with respect to application of compression to a data stream as the data transformation, but the present invention is not so limited and one skilled in the art might readily apply the teachings herein to other types of data stream processing, such as encryption.

Figure 1:
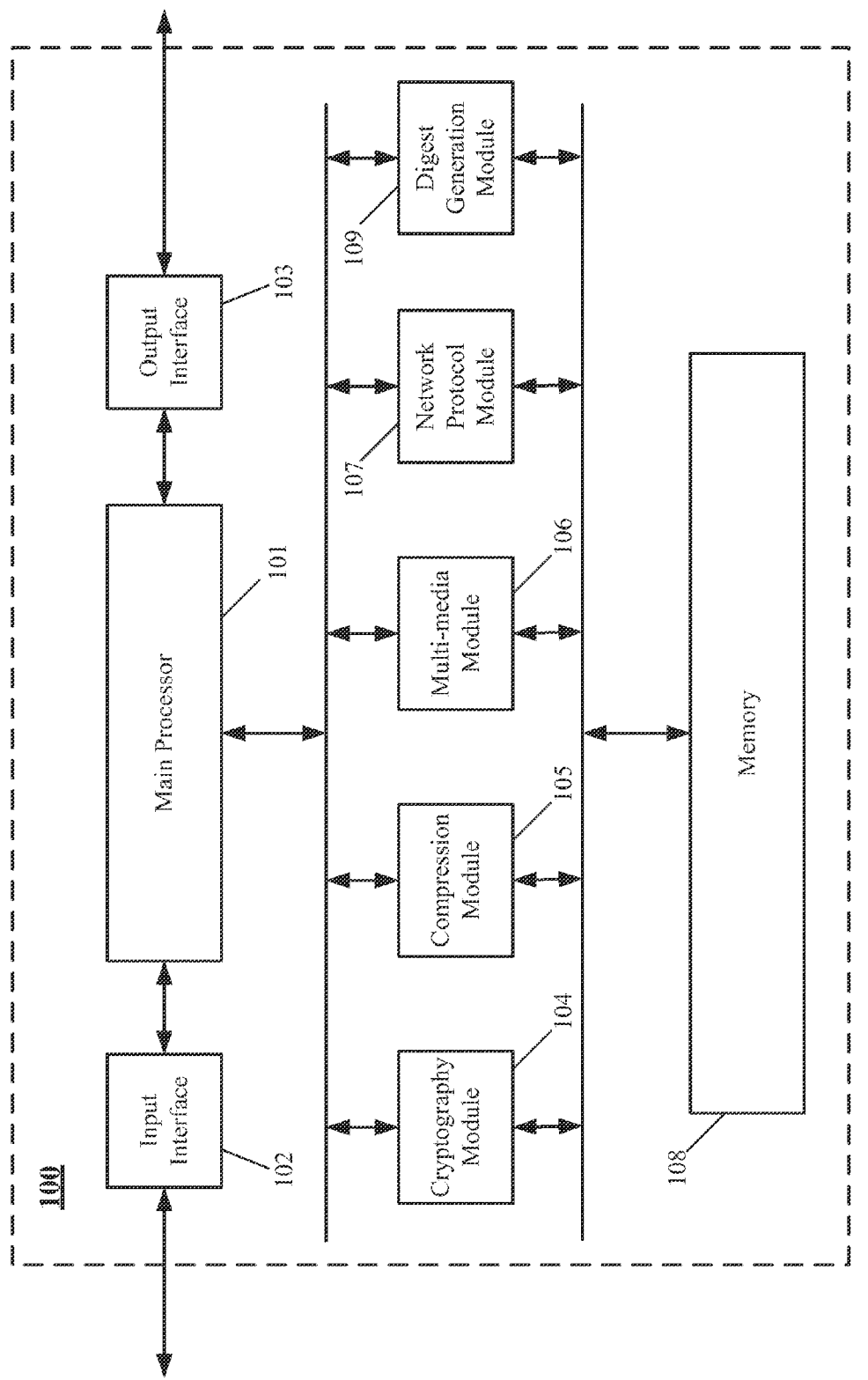
FIG. 1 shows an typical processing architecture as might be found in the prior art.
Figure 2:
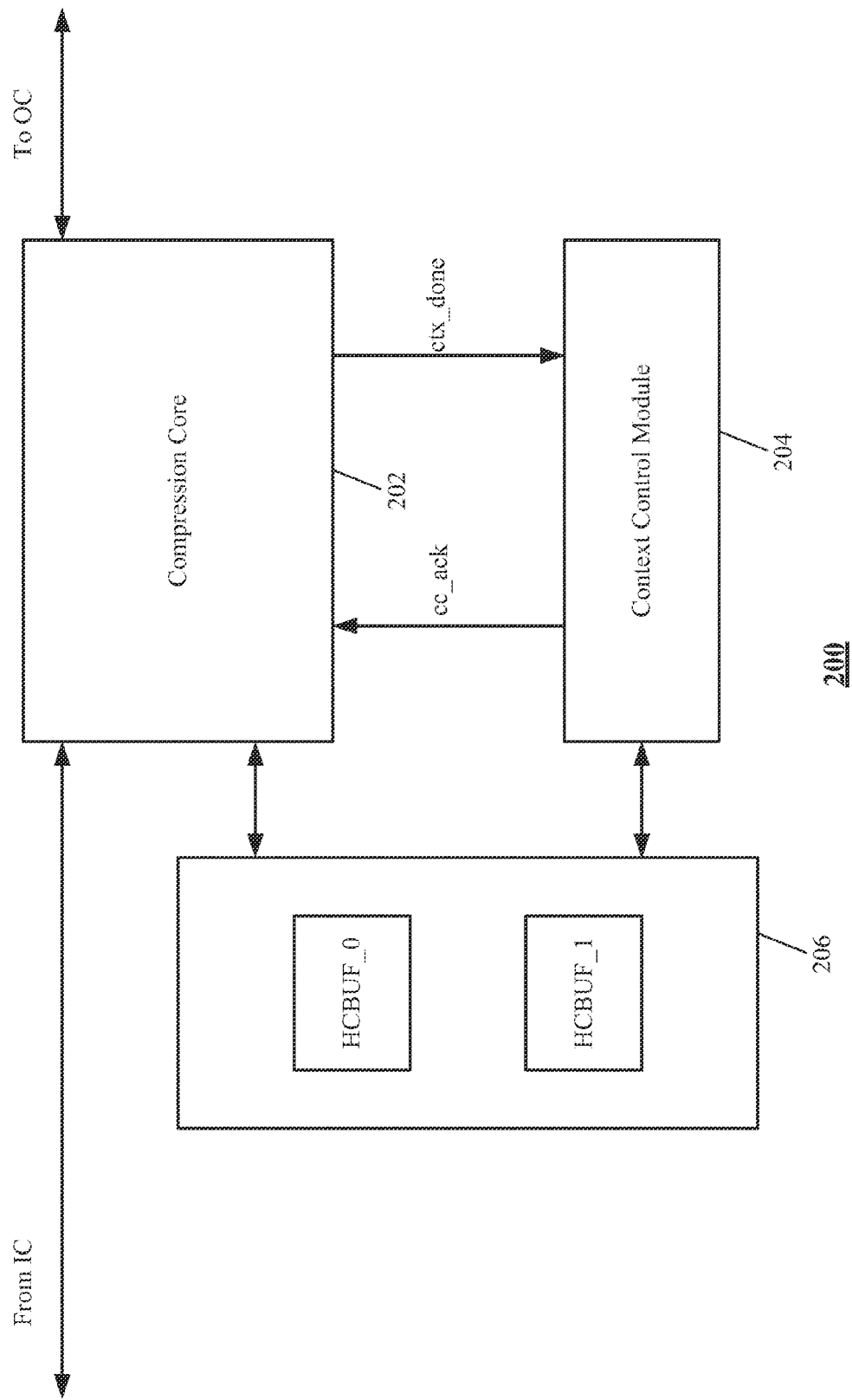
FIG. 2 shows an exemplary data stream processing system employing one or more exemplary embodiments of the present invention for compression.

FIG. 2 shows an exemplary data stream processing system 200 employing one or more exemplary embodiments of the present invention for compression. Data stream processing system 200 comprises compression core 202, context control module 204, context memory 206, and context control module 204. The data transfer for a data stream comprising one or more packet flows occurs from input circuitry (IC) to output circuitry (OC) through compression core 202. Compression core 202 is configured to apply any of number of known types of data compression to the data stream via a corresponding compression engine based on LZ or GZIP algorithms. Compression core 202 is coupled to context control module 204 and to context memory 206, and context control module 204 is coupled to context memory 206.

During compression applied by compression core 202, a history of previous data and tables for looking up into this history is generated by context control module 204, and then stored in context memory 206. This data forms the context for the compressor, and, as the history entries increase, context processing improves, thereby improving compression. In certain applications, the input data for a given data stream does not always arrive at once, but rather are broken up into packets. Also, packets of different data streams are mixed together when they reach compression core 202. So, when a packet of a particular data stream is compressed, the corresponding context data is saved, along with possibly past context data information/history as aggregated context data, and this saved, aggregated context data is subsequently employed for the compression of the next arriving packet of the particular data stream. When the saved context data is used to process the subsequently arriving packet of the particular stream, the corresponding previous history data is used. The compression engine might be optimized for using this previous history since knowledge of compression of the previous packet might enable the compression engine to avoid repeating analysis, state transition, and/or processing steps during the compression process for the packet. Thus, use of the context history provides better compression than if the packets was individually compressed.

Compression core 202 receives input data and buffers the data with, for example, a window random access memory (RAM) (not shown in the figure). The input interface of compression core 202 follows a hand-shake protocol with the external device to maintain the streaming interface. The data within the window RAM, hash information within a hash RAM and state information stored within art array of state registers form the aggregated context data, which are located within corresponding memory area locations of context memory 206, termed herein as HCBUFs. Two blocks of HCBUFs are shown in FIG. 2, allowing compression core 202 and context control module 204 to operate in parallel (e.g., when compression module 202 operates on data of a stream corresponding to HCBUF_0, context control module 204 is free to load the context data of the next stream in HCBUF_1. Compression core 202 also follows a hand-shake mechanism for streaming the data from compression core 202 to external devices. While the present invention shows two HCBUFs, the present invention is not so limited and a number of such blocks might be employed based on a given design to provide for appropriate parallel processes.

For an exemplary embodiment of the present invention, transformation data and history might appear as follows. The transformation data and history stored depends on the algorithm (core) used by the compression module, since compression and expansion (de-compression) operate slightly differently, De-compression history includes values and organization for all internal storage elements (memories and registers). The complete state of the algorithm design is stored. Upon recovery when compression core 202 receives the history from context memory 206, the complete set of registers and memories are recovered to the previous states prior to storage. Compression history, however, includes only a sub-set of the design storage elements of the de-compression history, The compression history includes some part of the previous packet, state machine registers and stream statistical information. Upon recovery, the information is reloaded, but the rest of the logic is set to a default state.

When compression core 202 requires context data for a data stream that is active (i.e., the data of the corresponding stream in process of compression), context control module 204 retrieves the context data from context memory 206 (or coordinates the direct transfer from the context memory 206 to compression core 202) and compression core 202 can continue with the compression of the stream. When the compressor is finished with a stream, context control module 204 writes the context data into context memory 206 for future use. Therefore, while compression core 202 is compressing data for a stream, context control module 204 is performing the access to context memory 206 and the context data is available to compression core 202 when the next stream starts. Consequently, the overhead due to context data save and retrieve operations is minimal and, for input data sizes that are above a certain threshold, there is relatively no overhead.

Figure 3:
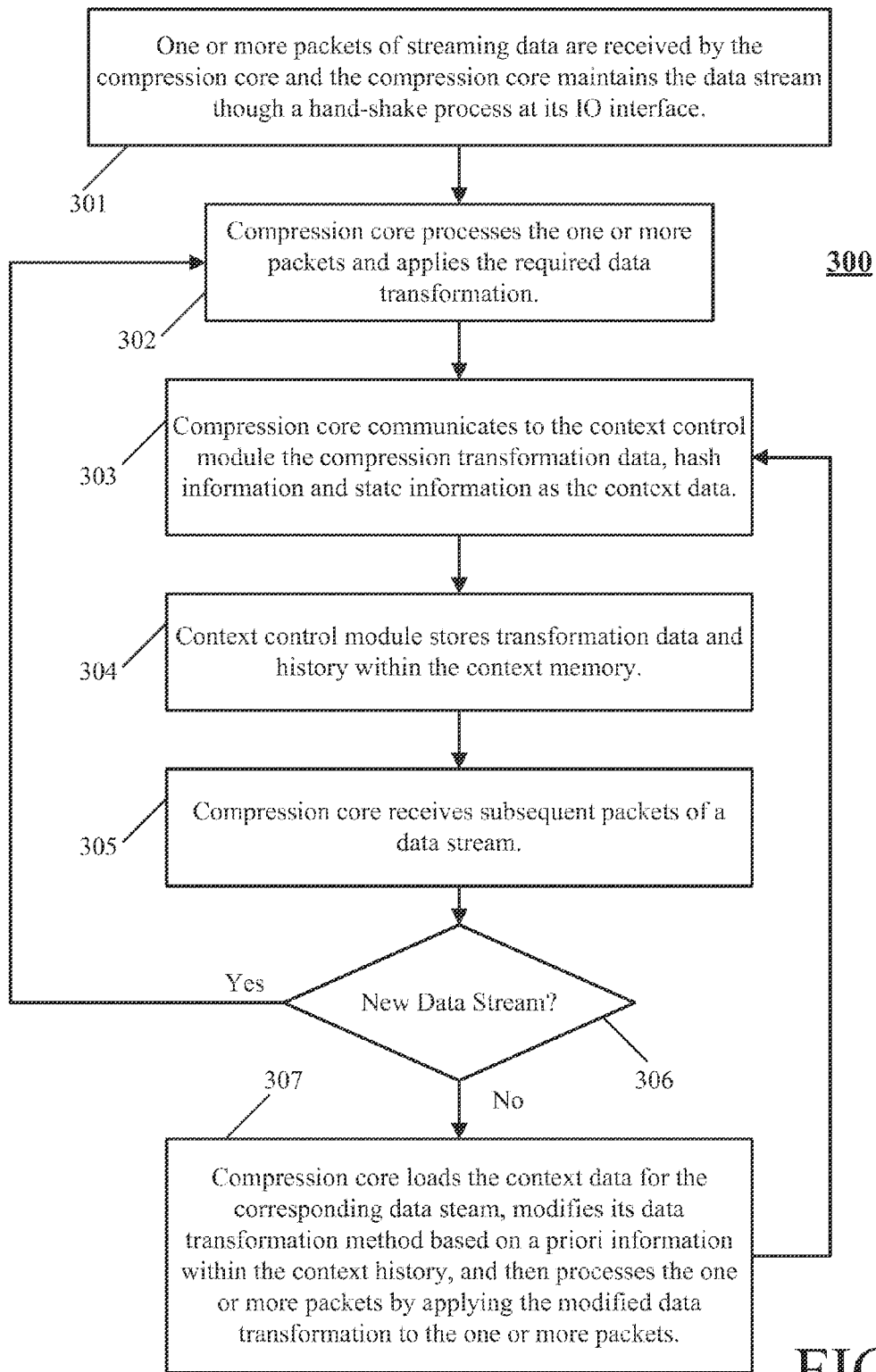
FIG. 3 shows an exemplary method as might be employed by data stream processing system of FIG. 2.

FIG. 3 shows an exemplary method 300 as might be employed by data stream processing system 200 of FIG. 2. At step 301, one or more packets of streaming data are received by the compression core and the compression core maintains the stream though a hand-shake process at its IO interface (while the present method 300 is described for "packets" as pieces of the data stream, the present invention is not so limited and other forms of portions of the data stream might he processed, including blocks, chunks, windowed portions, or randomly sized portions). At step 302, the compression core processes the one or more packets and applies the required data transformation to the extent it is able with the one or more packets, At step 303, the compression core communicates to the context control module the compression transformation data, hash information and state information as the context data (this process is accomplished through a hand-shake between the compression core and the context control module via signals cc_ack, representing context control acknowledgement and ctx_done, indicating context processing is done). Once received, at step 304, the context control module stores transformation data and history within the window RAM, hash information within the hash RAM and state information within an array of state registers of the context memory. Concurrently with step 304, at step 305, the compression core receives subsequent packets of a data stream, At step 306, a test determines whether the subsequent packets correspond to a new data stream, or to a previously received data stream, If the test of step 306 determines that the subsequent packets correspond to a new data stream, then the process advances to step 302.

If the test of step 306 determines that the subsequent packets correspond to a previously received data stream, then the process advances to step 307. At step 307, the compression core loads the context data for the corresponding data steam, modifies its data transformation method based on a priori information within the context history, and then processes the one or more packets by applying the modified data transformation to the one or more packets. From step 307, the method returns to step 303.

For an exemplary embodiment of the present invention, context memory 206 might be organized as follows. The information might be organized in one or more arrays, trees or hash memories. Other fast-searches or look-ups known in the art might also be employed.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" used herein to mean serving as an example, instance, or illustration. Any aspect or design described herein as "exemplary" is not necessarily to he construed as preferred or advantageous over other aspects or designs. Rather, use of the word exemplary is intended to present concepts in a concrete fashion.

Additionally, the term "or" is intended to mean an inclusive "or" rather than an exclusive "or", That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments, Rather, the techniques described herein can be applied to any suitable type of user-interactive component execution management methods, systems, platforms, and/or apparatus.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods, The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

No claim element herein is to be construed under the provisions of 35 U.S.C. §112, sixth paragraph, unless the element is expressly recited using the phrase "means for" or "step for."

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of context switching, the method comprising the steps of:
    applying, by a processor, a data transformation to at least one portion of a received data stream, the data transformation comprising at least one of cryptography, multimedia processing, network protocol conversion, and a compression/expansion conversion;
    generating, by the processor, i) corresponding current context data based on the data transformation of the at least one portion; and ii) a signal when the data transformation completes;
    storing, in memory, each context data for a corresponding data stream as aggregated context data, the aggregated context data including current context data for the at least one portion of the received data stream and previous context data, if present, the context data comprising transformation data and history information for each data transformation applied to one or more portions of the corresponding data stream; and
    coordinating transfer, by a context control sub-processor based on the signal, the aggregated context data of the received data stream between the processor and the context memory;
    wherein the transformation data and the history information for the compression/expansion conversion comprise at least one of (i) de-compression history including values and organization for all internal storage elements, and a complete state of the data transformation, thereby recovering previous states prior to storage and (ii) compression history having a sub-set of de-compression history, a portion of the previous packet, state machine registers and stream statistical information, wherein, upon recovery, the sub-set of de-compression history is retrieved, and remaining logic of the processing core is set to a default state.

2. The method of claim 1, further comprising:
    storing, in a first area of the memory, the context data for the at least one portion of the received data stream when the data transformation completes; and
    storing, in a second area of the memory, context data for at least one portion of a subsequent received data stream; and
    accessing, by the processor, the second area of the memory for a data transformation of the subsequent received data stream.

3. An apparatus for context switching, the apparatus comprising:
    a processor configured to i) apply a data transformation to at least one portion of a received data stream, generate corresponding current context data based on the data transformation of the at least one portion, and iii) generate a signal when the data transformation completes, wherein the data transformation comprises at least one of cryptography, multi-media processing, network protocol conversion, and a compression/expansion conversion;
    a memory configured to store each context data for a corresponding data stream as aggregated context data, the aggregated context data including current context data for the at least one portion of the received data stream and previous context data, if present, the context data comprising transformation data and history information for each data transformation applied to one or more portions of the corresponding data stream; and
    a context control sub-processor configured to, based on the signal, coordinate transfer of the aggregated context data of the received data stream between the processor and the memory,
    wherein the transformation data and the history information for the compression/expansion conversion comprise at least one of (i) de-compression history including values and organization for all internal storage elements, and a complete state of the data transformation, thereby recovering previous states prior to storage and (ii) compression history having a sub-set of de-compression history, a portion of the previous packet, state machine registers and stream statistical information, wherein, upon recovery, the sub-set of de-compression history is retrieved, and remaining logic of the processing core is set to a default state.

4. The apparatus of claim 3, wherein the context memory comprises:
    a first area of the memory configured to store the context data for the at least one portion of the received data stream when the data transformation completes; and
    a second area of the memory configured to store context data for at least one porlion of a subsequent received data stream, the processor further configured to access the second area for a data transformation of the subsequent received data stream.

5. A non-transitory machine-readable storage medium, having encoded thereon program code, wherein, when the program code is executed by a machine, the machine implements a method for context switching, comprising the steps of:

applying, by a processor, a data transformation to at least one portion of a received data stream, the data transformation comprising at least one of cryptography, multimedia processing, network protocol conversion, and a compression/expansion conversion;

generating, by the processor, i) corresponding current context data based on the data transformation of the at least one portion; and ii) a signal when the data transformation completes;

storing, in a memory, each context data for a corresponding data stream as aggregated context data, the aggregated context data including current context data for the at least one portion of the received data stream and previous context data, if present, the context data comprising transformation data and history information for each data transformation applied to one or more portions of the corresponding data stream; and coordinating transfer, by a context control sub-processor based on the signal, the aggregated context data of the received data stream between the processor and the memory;

wherein the transformation data and the history information for the compression/expansion conversion comprise at least one of (i) de-compression history including values and organization for all internal storage elements, and a complete state of the data transformation, thereby recovering previous states prior to storage and (ii) compression history having a sub-set of de-compression history, a portion of the previous packet, state machine registers and stream statistical information, wherein, upon recovery, the sub-set of de-compression history is retrieved, and remaining logic of the processor is set to a default state.

* * * * *